United States Patent Office 3,275,502
Patented Sept. 27, 1966

3,275,502
PESTICIDAL PHOSPHORYLATED THIOUREA
Glenn R. Price and Edward N. Walsh, Chicago Heights, Ill., assignors to Stauffer Chemical Company, New York, N.Y., a corporation of Delaware
No Drawing. Filed June 10, 1964, Ser. No. 374,180
10 Claims. (Cl. 167—22)

This invention relates to a new class of thioureas in which one of the nitrogen atoms of the thiourea group is substituted with a phosphoro ester group and a hydroxyalkyl and the second nitrogen atom is substituted with at least one hydroxyalkyl, a process for preparing said thioureas, and their method of use as pest controlling agents.

The compounds of the present invention have the general formula

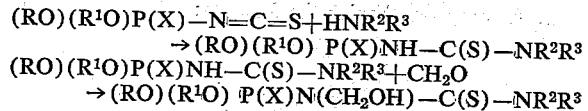

wherein R and $R^1$ are lower alkyl, X is selected from the group consisting of sulfur and oxygen, $R^2$ is hydroxyalkyl and $R^3$ is selected from the group consisting of lower alkyl and hydroxyalkyl. Suitable lower alkyl radicals for R, $R^1$, and $R^3$ include methyl, ethyl, propyl, isopropyl, amyl, octyl, and the like. The hydroxyalkyl radicals of $R^2$ and $R^3$ include such members are hydroxymethyl, hydroxyethyl, 2-(hydroxy) 2-(methyl) propyl-1, 2-(hydroxy) 2-(methyl) butyl-1, 2-(hydroxy) octyl-1, etc. The preferred thioureas of the present invention, namely those having the highest pesticidal activity, are those in which either $R^2$ and/or $R^3$ contain a hydroxyalkyl with a hydroxyl group in the beta position to the adjacent nitrogen.

The compounds of the present invention may be prepared according to the following general reactions:

(RO)($R^1$O)P(X)—N=C=S + HN$R^2R^3$
→ (RO)($R^1$O) P(X)NH—C(S)—N$R^2R^3$
(RO)($R^1$O)P(X)NH—C(S)—N$R^2R^3$ + CH$_2$O
→ (RO)($R^1$O) P(X)N(CH$_2$OH)—C(S)—N$R^2R^3$ wherein R, $R^1$, $R^2$, $R^3$, and X are as defined hereinbefore. The method for preparing the thiourea starting material of reaction II (i.e., the product of reaction I) is disclosed in U.S. Patent 3,083,135 issued March 26, 1963.

The products of the reaction are viscous oils or solids. Stoichiometric ratios of reactants are normally used and yields are generally quanitative. In the preferred method of reaction, an organic solvent or water is preferabbly used to solubilize or disperse the reactants. Among suitable organic solvents are acetone, acetonitrile, ethanol, and the like. The reaction will proceed at temperatures even as low as 0° C., and the product is stable at fairly high temperatures, at least as high as 100° C. Nevertheless, a preferred temperature range within which the highest product yields are usually obtained is between about 20° C. and 50° C.

Although the compounds of the present invention show pesticidal activity generally, their miticidal activity, especially with the two-spotted mite, *Tetranychus telarius*, is unexpectedly high.

The following examples illustrate the principles of the invention and include the best modes presently known for use in practice of these principles.

EXAMPLE 1

(CH$_3$O)$_2$P(S)—N(CH$_2$OH)—C(S)N(C$_2$H$_5$)(C$_2$H$_4$OH)

To a solution of 15.0 grams (0.055 mole) of N-(O,O,-dimethylphosphorothiono) $N^1$-(ethyl)-$N^1$-hydroxyethyl) thiourea was added 8.0 grams (0.06 mole) of potassium carbonate, 100 ml. of water and 10 ml. of 40% aqueous formaldehyde solution at room temperature. The reaction mixture was allowed to stir at room temperature for sixteen hours and then the water was removed under partial vacuum. The organic material was separated from the inorganic salts by extraction with acetone. The acetone was removed and the product concentrated to 50° C. at 1.0 mm. of Hg pressure to yield 96% N-(O,O-dimethylphosporothiono)-N-(hydroxymethyl) $N^1$-(ethyl)-$N^1$-(hydroxethyl) thiourea analyzing as 10.4% P and 20.9% S as compared to 10.2% P and 21.1% S theoretical.

EXAMPLE 2

(CH$_3$O)$_2$P(S)—N(CH$_2$OH)—C(S)—N(CH$_3$)(C$_2$H$_4$OH)

To 25.6 grams (0.14 mole) of O,O-dimethylphosphoroisothiocyanato thionate in 150 ml. of ether was added 10.5 grams (0.14 mole) of methylaminoethanol at room temperature. The reaction mixture was heated to 70° C. on a steam cone and then cooled to room temperature and added to 150 ml. of water containing 20.0 grams of potassium carbonate and 25 ml. of 40% aqueous formaldehyde solution. The reaction mixture was allowed to stir for 16 hours at room temperature and then the water was removed under partial vacuum. The organic material was separated from the inorganic salts by extraction with acetone. The acetone was removed and the product concentrated to 50° C. at 1.0 mm. of Hg pressure to yield 83% N-(O,O-dimethylphosphorothiono) N-(hydroxymethyl-$N^1$-(methyl)-$N^1$-(hydroxethyl) thiourea analyzing as 10.9% P and 22.1% S as compared to 10.8% P and 22.2% S theoretical.

EXAMPLE 3

(CH$_3$O)$_2$P(S)—N(CH$_2$OH)—C(S)
—N(C$_2$H$_4$OH)(i—C$_3$H$_7$)

To 25.6 grams (0.14 mole) of O,O-dimethylphosphoroisothiocyanato thionate in 150 ml. of ether was added 14.4 grams (0.14 mole) N-(isopropyl) ethanol amine at room temperature. The reaction mixture was heated to 70° C. on a steam cone, then cooled to room temperature and added to 150 ml. of water. To this mixture was added 20.0 grams of potassium carbonate and 25 ml. of 40% aqueous formaldehyde solution. The reaction mixture was allowed to stir for sixteen hours and then the water was removed under partial vacuum. The organic material was separated from the inorganic salts by extraction with acetone. The acetone was removed and the product concentrated to 50° C. at 1.0 mm. of Hg pressure to yield 86% N-(O,O-dimethylphosphorothiono)-N-(hydroxymethyl)-$N^1$-(isopropyl)-$N^1$-(hydroxyethyl) thiourea analyzing 10.0% P and 19.8% S as compared to 9.8% P and 20.2% S, theoretical.

Using a procedure substantially in accordance with one or more of those described in the foregoing examples, the following specific compounds were prepared.

EXAMPLE 4

(CH$_3$O)$_2$P(O)—N(CH$_2$OH)
—C(S)—N(C$_2$H$_5$)(C$_2$H$_4$OH)
N-(O,O - dimethylphosphoryl)-N-(hydroxymethyl)-$N^1$-(ethyl)$N^1$-(hydroxyethyl) thiourea.

EXAMPLE 5

(i—C$_3$H$_7$O)$_2$P(S)—N(CH$_2$OH)—C(S)—N(C$_2$H$_4$OH)$_2$
N-(O,O - diisopropylphosphorothiono)-N(hydroxymethyl)-$N^1$,$N^1$-(dihydroxyethyl) thiourea.

EXAMPLE 6

(C$_2$H$_5$O)$_2$P(S)—N(CH$_2$OH)
—C(S)—N(C$_2$H$_4$OH)(C$_6$H$_5$)
N-(O,O - diethylphosphorothiono)-N(hydroxymethyl)-$N^1$-(hydroxyethyl)$N^1$-(phenyl) thiourea.

Insecticidal activity for the compounds of the foregoing examples is illustrated in Table I wherein the percentage kill among the pest species is reported for a specified quantity of candidate compound, expressed in micrograms (μg.—herein termed the bioassay test) or for a percentage concentration of the compound in aqueous dispersion (herein termed the screening test). A slanted line is used to separate the percentage kill for the test species shown on the left from the percentage concentration or total quantity shown on the right.

Insect test species

Housefly—*Musca domestica*
American cockroach—*Periplaneta americana*
Spotted milkweed bug—*Oncopeltus fasciatus*

Mite test species

Two-spotted mite—*Tetranychus telarius*

TABLE I.—MORTALITY OF REPRESENTATIVE SPECIES OF COMMON INSECT ORDERS

| Compound (Example number, see supra) | M. domestica | P. americana | O. fasciatus | T. telarius | | | Systemic |
|---|---|---|---|---|---|---|---|
| | | | | Post embryonic | Nymphs | Eggs | |
| 1, μg | 50/30 | 50/0.1 | 50/0.001 | 100/0.001 | 50/0.001 | 50/0.001 | 50/0.5 p.p.m. |
| 2, μg | 100/0.1 | 100/0.1 | 100/0.1 | 100/0.005 | 100/0.1 | 100/0.1 | 100/1 p.p.m. |

In the screening tests for the insect species of Table I, from ten to twenty-five insects were caged in cardboard mailing tubes 3⅛" in diameter and 2⅝" tall. The cages were supplied with cellophane bottoms and screen tops. Food and water were supplied to each cage. Dispersions of the test compounds were prepared by dissolving one half gram of the toxic material in 10 ml. of acetone. This solution was then diluted with water containing 0.0175% v./v. Sponto 221, an emulsifying agent, the amount of water being sufficient to dilute the active ingredients to a concentration of 0.1% or below. The test insects were then sprayed with this dispersion. After twenty-four and seventy-two hours, counts were made to determine living and dead insects.

Some of the compounds which showed high mortality on house flies in the screening test were bioassayed on M. domestica. In this test, a known quantity of the toxicant was placed in a confined area. The same cages were employed as for the fly screening test. A weighed amount of the toxicant was placed in pyrex petri dishes having a surface area of 18.8 sq. centimeters along with 1 ml. of acetone. After the solvent was evaporated by air-drying, a cage containing groups of twenty-five female flies, three to five days old, was placed over the residue. Counts of living and dead insects were made forty-eight hours after initiation of the test.

It has been further found that the compounds of the present invention are excellent systemic miticides. In testing for systemic action, pinto bean plants were placed in bottles containing 200 ml. of the test solution and were held in place with cotton plugs. Only the roots were immersed. The solutions were prepared by dissolving the candidate miticide in acetone or other suitable solvent and then diluting with tap water. The final acetone concentration of the solution was never allowed to exceed 1% and the toxicant was initially tested at a concentration of 100 p.p.m. As soon as the plants were placed in the solution they were infested with mites. Mortalities of post embryonic, nymph and ovicidal forms were determined seven days after initiation of the test.

Although the above tests were accomplished with aqueous dispersions, the toxic compounds can also be used commercially in the form of aqueous solutions when appreciably soluble, non-aqueous solutions, wettable powders, vapors, and dusts as best suited to the conditions of use. In many applications, fillers will be incorporated with the toxic compounds. For more specialized application, the material may even be used in its pure, undiluted form.

When used herein the term "pest" is intended in the restricted sense generally recognized in the art as applying to the lower forms of life customarily controlled by chemical means and excluding the higher animals, the vertebrates, for example, rodents, birds, and larger forms which are more commonly controlled by mechanical means such as traps. It will be apparent to one skilled in the art that the toxic activity demonstrated hereinbefore on various test species is indicative of activity with species and orders not specifically shown.

The foregoing description is given for clearness of understanding only and no unnecessary limitations should be understood therefrom, as modifications will be obvious to those skilled in the art.

We claim:

1. A compound having the formula:

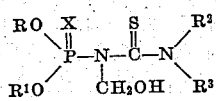

wherein R and R¹ are lower-alkyl, X is selected from the group consisting of sulfur and oxygen, R² is a hydroxyalkyl and R³ is selected from the group consisting of lower-alkyl and hydroxyalkyl.

2. N-(O,O-dimethylphosphorothiono)-N-(hydroxy)-methyl)-N¹-(ethyl)-N¹-(hydroxyethyl) thiourea.

3. N-(O,O-dimethylphosphorothiono)-N-(hydroxy-methyl)-N¹-(isopropyl)-N¹-(hydroxyethyl) thiourea.

4. N-(O,O-dimethylphosphorothiono)-N-(hydroxy-methyl)-N-(methyl-N¹-(hydroxyethyl) thiourea.

5. A method of controlling pests which comprises contacting said pests with a pesticidal amount of at least one compound having the formula:

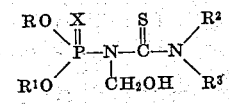

wherein R and R¹ are lower-alkyl, X is selected from the group consisting of sulfur and oxygen, R² is a hydroxyalkyl, and R³ is selected from the group consisting of lower-alkyl and hydroxyalkyl.

6. The method of controlling pests which comprises contacting said pests with a pesticidal amount of N-(O,O-dimethylphosphorothiono)-N-(hydroxymethyl)-N¹-(ethyl)-N¹-(hydroxyethyl) thiourea.

7. The method of controlling pests which comprises contacting said pests with a pesticidal amount of N-(O,O-dimethylphosphorothiono) - N - (hydroxymethyl)-N¹-(isopropyl)-N¹-(hydroxyethyl) thiourea.

8. The method of controlling pests which comprises contacting said pests with a pesticidal amount of N-(O,O-dimethylphosphorothiono) - N - (hydroxymethyl)-N¹-(methyl)-N¹-(hydroxyethyl) thiourea.

9. A process for preparing a compound of the general formula:

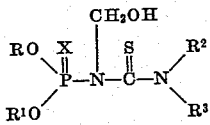

wherein R and R¹ are lower alkyl, X is selected from the group consisting of oxygen and sulfur, R² is hydroxyalkyl, and R³ is selected from the group consisting of lower alkyl and hydroxyalkyl, which comprises reacting a compound of the formula

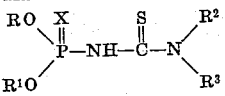

wherein R, R¹, X, R² and R³ are as hereinbefore defined, with formaldehyde while maintaining the reaction temperature between about 0° C. and 100° C.

10. The process of claim 9 wherein the reaction is accomplished in the presence of a solvent selected from the group consisting of water, acetone, acetonitrile and ethanol.

References Cited by the Examiner

UNITED STATES PATENTS 3,083,135   3/1963   Price et al. _____ 167—22

FOREIGN PATENTS 952,712   11/1956   Germany.

JULIAN S. LEVITT, *Primary Examiner.*

V. C. CLARKE, *Assistant Examiner.*